US010755665B2

United States Patent
Han et al.

(10) Patent No.: US 10,755,665 B2
(45) Date of Patent: Aug. 25, 2020

(54) PIXEL CIRCUIT, ARRAY SUBSTRATE, DISPLAY PANEL AND ELECTRONIC APPARATUS

(71) Applicant: BOE TECHNOLOGY GROUP CO., LTD., Beijing (CN)

(72) Inventors: Seungwoo Han, Beijing (CN); Guangliang Shang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/450,226

(22) Filed: Jun. 24, 2019

(65) Prior Publication Data

US 2020/0020295 A1    Jan. 16, 2020

(30) Foreign Application Priority Data

Jul. 13, 2018 (CN) .......................... 2018 1 0770479

(51) Int. Cl.
*G09G 3/36* (2006.01)
*G02F 1/1362* (2006.01)
*G02F 1/1368* (2006.01)

(52) U.S. Cl.
CPC ......... *G09G 3/3688* (2013.01); *G02F 1/1368* (2013.01); *G02F 1/136286* (2013.01); *G09G 2300/0426* (2013.01); *G09G 2300/0439* (2013.01); *G09G 2300/0809* (2013.01)

(58) Field of Classification Search
CPC ......... G09G 3/3688; G09G 2300/0426; G09G 2300/0439; G09G 2300/0809; G02F 1/136286; G02F 1/1368
See application file for complete search history.

(56) References Cited

U.S. PATENT DOCUMENTS

2017/0256205 A1*    9/2017 Zhu ..................... G09G 3/3233

* cited by examiner

*Primary Examiner* — Wing H Chow
(74) *Attorney, Agent, or Firm* — Brooks Kushman P.C.

(57) ABSTRACT

A pixel circuit, an array substrate, a display panel and an electronic apparatus are provided. The pixel circuit includes: a data writing sub-circuit, a first data storage sub-circuit, a second data storage sub-circuit and a light-emitting control sub-circuit. The data writing sub-circuit writes, under the control of a signal input from a first control signal input end, to the first data storage sub-circuit a data signal input from a data signal input end, and writes, under the control of a signal input from a second control signal input end, to the second data storage sub-circuit the data signal input from the data signal input end. The light-emitting control sub-circuit controls on/off states of corresponding thin film transistors in accordance with data signals output from the first data storage sub-circuit and the second data storage sub-circuit, so that different gray-scales may be rendered.

10 Claims, 2 Drawing Sheets

PIXEL CIRCUIT, ARRAY SUBSTRATE, DISPLAY PANEL AND ELECTRONIC APPARATUS

CROSS-REFERENCE TO RELATED APPLICATION

This application claims priority to Chinese Patent Application No. 201810770479.5 filed on Jul. 13, 2018, which is incorporated herein by reference in its entirety.

TECHNICAL FIELD

The present application relates to the field of display technology, in particular to a pixel circuit, an array substrate, a display panel and an electronic apparatus.

BACKGROUND

If animated or still images are input to a liquid crystal display panel, the voltages of data signals of the input images are fed to respective sub-pixels in each frame so that the images are displayed. Since the respective sub-pixels are fed with data signals in each frame, power consumption of the source driver circuit and the gate driver circuit can't be lowered below certain level.

To lower the power consumption of the liquid crystal display panel, the memory in pixel (MIP) technique is proposed, in which each sub-pixel is provided with a circuit including a memory cell, and when a still image is input, data signal is refreshed with the data signal voltage stored in the memory cell, meanwhile the source driver circuit is disabled, leading to a lower power consumption of the source driver circuit.

However, in order to implement MIP, the display panel is restricted to display only two gray-scales. With mainstream display panels are evolving to have better image quality, the display panels and electronic apparatuses capable of displaying merely two gray-scales can no longer satisfy the current demand for better image quality.

SUMMARY

In a first aspect, an embodiment of the present application provides a pixel circuit, comprising: a data writing sub-circuit, a first data storage sub-circuit, a second data storage sub-circuit and a light-emitting control sub-circuit. The data writing sub-circuit is connected to a data signal input end, a first control signal input end, a second control signal input end, the first data storage sub-circuit and the second data storage sub-circuit, and is configured to write, under the control of a signal input from the first control signal input end, to the first data storage sub-circuit a data signal input from the data signal input end, and write, under the control of a signal input from the second control signal input end, to the second data storage sub-circuit the data signal input from the data signal input end. The first data storage sub-circuit is connected to the data writing sub-circuit and a first node, and is configured to store the data signal written by the data writing sub-circuit and output the data signal to the first node. The second data storage sub-circuit is connected to the data writing sub-circuit, the first node, a second node and a third node, and is configured to store the data signal written by the data writing sub-circuit, output the data signal to the second node, invert the data signal and output the inverted data signal to the third node. The light-emitting control sub-circuit is connected to the first node, the second node, the third node, a first gray-scale signal input end, a second gray-scale signal input end, a third gray-scale signal input end and a gray-scale signal output end, and is configured to output, under the control of a signal input from the first node, to the gray-scale signal output end a first gray-scale signal input from the first gray-scale signal input end, output, under the control of a signal input from the second node, to the gray-scale signal output end a second gray-scale signal input from the second gray-scale signal input end, and output, under the control of a signal input from the third node, to the gray-scale signal output end a third gray-scale signal input from the third gray-scale signal input end.

In a second aspect, an embodiment of the present application provides an array substrate, comprising a plurality of data lines, a plurality of gate lines and a plurality of sub-pixel units defined by the plurality of data lines and the plurality of gate lines crossing each other in an insulative manner, wherein each of the plurality of sub-pixel units is provided with a pixel circuit as provided in the first aspect of embodiments of the present application. Each row of the sub-pixel units corresponds to two gate lines, one of the two gate lines is connected to the first control signal input end and another one of the two gate lines is connected to the second control signal input end. Each column of the sub-pixel units corresponds to a data line which is connected to the data signal input end.

In a third aspect, an embodiment of the present application provides a display panel, comprising an array substrate as provided in the second aspect of embodiments of the present application, an opposite substrate arranged opposite to the array substrate, and a liquid crystal layer between the array substrate and the opposite substrate.

In a fourth aspect, an embodiment of the present application provides an electronic apparatus, comprising a pixel circuit as provided in the first aspect of embodiments of the present application or a display panel as provided in the third aspect of embodiments of the present application.

Additional aspects and advantages of the present application, which will become apparent from the following description or will be learned during the practice of the application, will be given partly in the following description.

BRIEF DESCRIPTION OF THE DRAWINGS

These and/or additional aspects and advantages of the present application will become apparent and more readily appreciated from the following descriptions made with reference to the accompanying drawings, in which.

DETAILED DESCRIPTION

Figure 1:
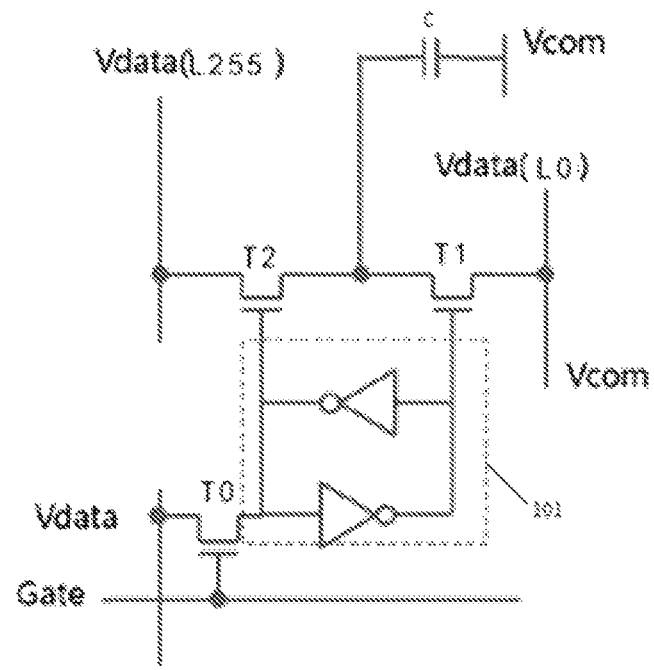
FIG. 1 is a structural schematic diagram of a pixel circuit.

The present application is detailed in the following description, and examples of the embodiments of the present application are shown in the accompanying drawings, wherein same or like reference characters designate same or like parts or parts having same or like functions throughout the several views. Further, a detailed description of known art will be omitted if it is deemed unnecessary for illustration of the feature of the present application. It is to be understood that the embodiments described hereinafter with reference to the accompany drawings are exemplary, solely for the purpose of explanation of the present application and in no way limit the application.

It is understood by persons skilled in the art that, unless defined otherwise, all technical and scientific terms used herein have the same meaning as commonly understood by one of ordinary skill in the art to which this application belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is understood by persons skilled in the art that, as used herein, the singular forms, "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected to" another element, it can be directly connected to the other element or intervening elements may also be present. In addition, the term "connection" as used herein may include a wireless connection. The term "and/or" as used herein includes any and all combinations of one or more of the associated listed items.

Firstly, several terms referred to in the present application are explained as follows.

Gray-scale refers to that objects are depicted with shades of black, that is, pure black is used as a baseline and shades of black of different saturations are used to display image. Each gray-scale object has a luminance ranging from 0% to 100%, i.e., from pure white to pure black.

High impedance (Hi-z) refers to an output state of a circuit, in which the output signal is neither driven to a high nor low level. If a high impedance output is input to a next stage of circuit, the next stage of circuit will not be affected, and depending on the subsequently connected circuits, the output signal measured with a multimeter may be at high level or low level.

FIG. 1 is a schematic diagram of a pixel circuit. As shown in FIG. 1, in order to lower power consumption, the MW technique is employed in the pixel circuit, wherein each sub-pixel is provided with a circuit including a memory cell 101, and data signal is refreshed with the data signal voltage stored in the memory cell 101, meanwhile the source driver circuit is disabled, leading to a lower power consumption of the source driver circuit.

As shown in FIG. 1, in the existing pixel circuit, when a high level signal is input at the control signal input end Gate, the connected thin film transistor T0 is turned on, thereby the data signal at the data signal input end Vdata may be stored in the built-in memory circuit 101, wherein the memory circuit 101 includes a pair of inverters connected end to end.

If a data signal at the data signal input end Vdata is "0", then having been inverted once by an inverter in the memory circuit 101, an output data signal is "1", whereby the thin film transistor T1 is turned on, enabling the storage of a gray-scale signal input from the black gray-scale data signal input end Vdata(L0) in a designated storage capacitor C, thus black color is rendered.

If a data signal at the data signal input end Vdata is "0", then having been inverted twice by inverters in the memory circuit 101, an output data signal is "0", whereby the thin film transistor T2 is not turned on.

If a data signal at the data signal input end Vdata is "1", then having been inverted once by the inverter in the memory circuit 101, an output data signal is "0", whereby the thin film transistor T1 is not turned on.

If a data signal at the data signal input end Vdata is "1", then having been inverted twice by the inverters in the memory circuit 101, an output data signal is "1", whereby the thin film transistor T2 is turned on, enabling the storage of a gray-scale signal input from the white gray-scale data signal input end Vdata(L255) in the designated storage capacitor C, thus white color is rendered.

It is can be seen that, in order to implement MIP, the display panel including the pixel circuits may display only two gray-scales. With mainstream display panels are evolving to have high image quality, the display panels and electronic apparatuses capable of displaying merely two gray-scales can no longer satisfy the current demand for high image quality.

The technical solution of this application and how the aforementioned problems are addressed by the technical solution are detailed below with reference to specific embodiments.

Embodiment 1

Figure 2:
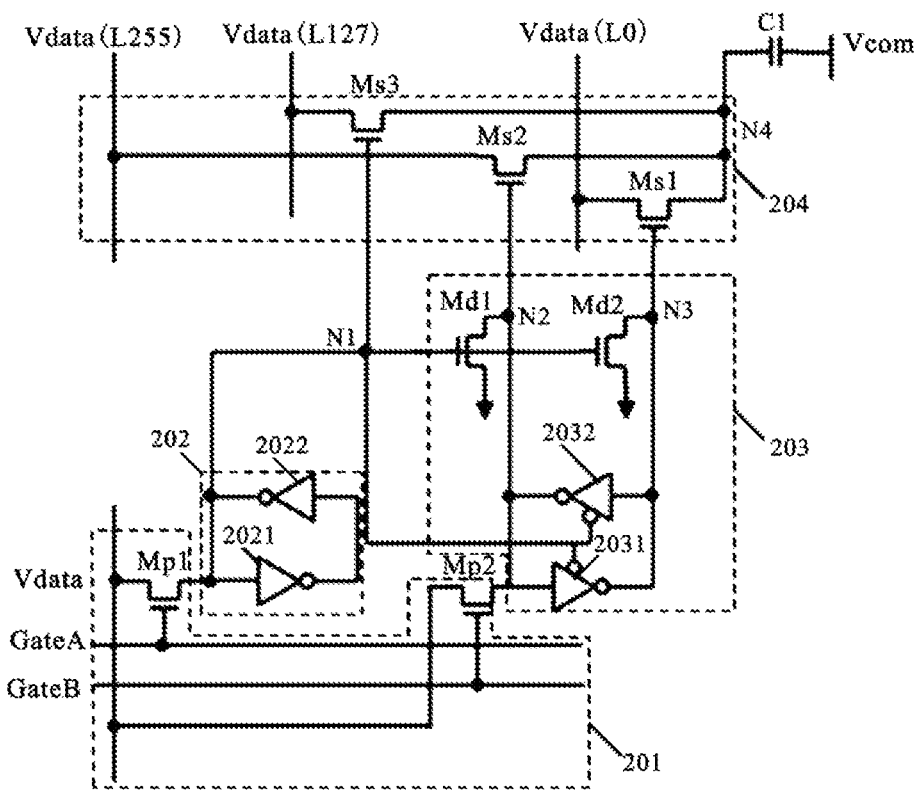
FIG. 2 is a structural schematic diagram of a pixel circuit according to an embodiment of the present application.

FIG. 2 is a schematic diagram of a pixel circuit according to the embodiment of the present application. As shown in FIG. 2, the pixel circuit comprises: a data writing sub-circuit 201, a first data storage sub-circuit 202, a second data storage sub-circuit 203 and a light-emitting control sub-circuit 204.

The data writing sub-circuit 201 is connected to a data signal input end Vdata, a first control signal input end GateA, a second control signal input end GateB, the first data storage sub-circuit 202 and the second data storage sub-circuit 203, and is configured to write, under the control of a signal input from the first control signal input end GateA, to the first data storage sub-circuit 202 a data signal input from the data signal input end Vdata, and write, under the control of a signal input from the second control signal input end GateB, to the second data storage sub-circuit 203 the data signal input from the data signal input end Vdata.

The first data storage sub-circuit 202 is connected to the data writing sub-circuit 201 and a first node N1, and is configured to store the data signal written by the data writing sub-circuit 201 and output the data signal to the first node N1.

The second data storage sub-circuit 203 is connected to the data writing sub-circuit 201, the first node N1, a second node N2 and a third node N3, and is configured to store the data signal written by the data writing sub-circuit 201, invert the data signal and output the inverted data signal to the third node N3, and output the data signal to the second node N2.

The light-emitting control sub-circuit 204 is connected to the first node N1, the second node N2, the third node N3, a first gray-scale signal input end Vdata(L127), a second gray-scale signal input end Vdata(L255), a third gray-scale signal input end Vdata(L0) and a gray-scale signal output end N4, and is configured to output, under the control of a signal input from the first node N1, to the gray-scale signal output end N4 a first gray-scale signal input from the first gray-scale signal input end Vdata(L127), output, under the control of a signal input from the second node N2, to the gray-scale signal output end N4 a second gray-scale signal input from the second gray-scale signal input end Vdata (L255), and output, under the control of a signal input from the third node N3, to the gray-scale signal output end N4 a third gray-scale signal input from the third gray-scale signal input end Vdata(L0).

Since the pixel circuit of the embodiment 1 of the present application is provided with the first data storage sub-circuit 202 and the second data storage sub-circuit 203, the data writing sub-circuit 201 is able to write, under the control of the signal input from the first control signal input end GateA, to the first data storage sub-circuit 202 the data signal at the data signal input end Vdata, and write, under the control of the signal input from the second control signal input end GateB, to the second data storage sub-circuit 203 the data signal at the data signal input end Vdata; the first data storage sub-circuit 202 is able to store the data signal written by the data writing sub-circuit 201 and output the data signal to the first node N1, and the second data storage sub-circuit 203 is able to store the data signal written by the data writing sub-circuit 201, output the data signal to the second node N2, invert the data signal and output the inverted data signal to the third node N3; the light-emitting control sub-circuit 204 is connected to the first node N1, the second node N2, the third node N3, the first gray-scale signal input end Vdata(L127), the second gray-scale signal input end Vdata (L255), the third gray-scale signal input end Vdata(L0) and the gray-scale signal output end N4, and is able to output, under the control of the signal input from the first node N1, to the gray-scale signal output end N4 the first gray-scale signal input from the first gray-scale signal input end Vdata (L127), output, under the control of the signal input from the second node N2, to the gray-scale signal output end N4 the second gray-scale signal input from the second gray-scale signal input end Vdata(L255), and output, under the control of the signal input from the third node N3, to the gray-scale signal output end N4 the third gray-scale signal input from the third gray-scale signal input end Vdata(L0). In comparison with the conventional art, the embodiment of the present application is capable of displaying three gray-scales, which satisfying the demand for high image quality of display panels and electronic apparatuses.

It is to be noted, the first data storage sub-circuit 202 is provided with an output end which is connected to the first node N1, and configured to store the data signal written by the data writing sub-circuit 201, while the source driver circuit is disabled, the data signal stored in the first data storage sub-circuit 202 is input to the first node N1 again. The second data storage sub-circuit 203 is provided with two output ends which are connected to the second node N2 and the third node N3 respectively, and configured to store the data signal written by the data writing sub-circuit 201, while the source driver circuit is disabled, the data signal stored in the data storage sub-circuit 203 is input to the second node N2 and the third node N3 again.

As shown in FIG. 2, when the data signal stored in the first data storage sub-circuit 202 is at low level and the data signal stored in the second data storage sub-circuit 203 is at low level, the second data storage sub-circuit 203 inverts the logical level of the stored data signal and outputs a high level data signal to the third node N3.

When the data signal stored in the first data storage sub-circuit 202 is at low level and the data signal stored in the second data storage sub-circuit 203 is at high level, the second data storage sub-circuit outputs a stored high level data signal to the second node N2.

If the data signal stored in the first data storage sub-circuit 202 is at high level, then regardless of the level of the data signal stored in the second data storage sub-circuit 203, the second data storage sub-circuit 203 lows the level of the second node N2 and the third node N3 so that both the second node N2 and the third node N3 are both at low level, so as to ensure that the data signal output by the first data storage sub-circuit 202 to the first node N1 is at high level.

Optionally, as shown in FIG. 2, the pixel circuit of the embodiment of the present application is further provided with a storage capacitor C1, wherein a first terminal of the storage capacitor C1 is connected to the gray-scale signal output end N4, and a second terminal of the storage capacitor C1 is connected to a common electrode or ground.

The storage capacitor C1 provided in the embodiment of the present application is configured to store the signal output by the gray-scale signal output end, so that a designated gray-scale may be rendered.

Embodiment 2

On the basis of the pixel circuit structure provided in the embodiment 1 of the present application, the embodiment 2 of the present application illustrates detail the specific structures of the various sub-circuits of the pixel circuit.

Optionally, the data writing sub-circuit 201 comprises a first thin film transistor Mp1 and a second thin film transistor Mp2.

A gate electrode of the first thin film transistor Mp1 is connected to the first control signal input end GateA, a first electrode (e.g., source electrode) of the first thin film transistor Mp1 is connected to the data signal input end Vdata, and a second electrode (e.g., drain electrode) of the first thin film transistor Mp1 is connected to the first data storage sub-circuit 202.

A gate electrode of the second thin film transistor Mp2 is connected to the second control signal input end GateB, a first electrode (e.g., source electrode) of the second thin film transistor Mp2 is connected to the data signal input end Vdata, and a second electrode (e.g., drain electrode) of the second thin film transistor Mp2 is connected to the second data storage sub-circuit 203.

It is to be noted, the source and drain electrodes of the first thin film transistor Mp1 may be exchanged and the source and drain electrodes of the second thin film transistor Mp2 may be exchanged.

It is to be noted, in the embodiments of the present application, "1" represents high level, and "0" represents low level.

It is to be noted, the data writing sub-circuit 201 is configured to write, under the control of the signal input from the first control signal input end GateA, to the first data storage sub-circuit 202 the data signal at the data signal input end Vdata, and write, under the control of the signal input from the second control signal input end GateB, to the second data storage sub-circuit 203 the data signal at the data signal input end Vdata. When a high level is input at the first control signal input end GateA, the first thin film transistor Mp1 controlling the connection to the data signal input end Vdata is turned on, thereby the data signal at the data signal input end Vdata is written to the first data storage sub-circuit 202 via the first thin film transistor Mp1. When a high level is input at the second control signal input end GateB, the second thin film transistor Mp2 controlling the connection to the data signal input end Vdata is turned on, thereby the data signal at the data signal input end Vdata is written to the second data storage sub-circuit 203 via the second thin film transistor Mp2.

Optionally, the first data storage sub-circuit 202 comprises a first inverter 2021 and a second inverter 2022.

The first inverter 2021 and the second inverter 2022 are connected end to end; the first inverter 2021 is configured to invert the data signal written by the data writing sub-circuit 201 and output the data signal to the second inverter 2022; and the second inverter 2022 is configured to invert the data signal output by the first inverter 2021 and output the data signal to the first node N1.

It is to be noted, the first inverter 2021 may invert the data signal written by the data writing sub-circuit 201 for the first time, the second inverter 2022 may invert the data signal written by the data writing sub-circuit 201 again and output the inverted signal to the first node, thereby enabling the storage of data signal. For example, the data signal written by the data writing sub-circuit 201 may be "1", the data signal in the first data storage sub-circuit 202 is converted to "0" following the first inversion by the first inverter 2021, and after the second inversion by the second inverter 2022, the data signal in the first data storage sub-circuit 202 is converted to "1". In a similar way, a data signal "0" written by the data writing sub-circuit 201 can be stored in the first data storage sub-circuit 202. When the source driver circuit is in a disabled state, the data signal stored in the first data storage sub-circuit 202 is input to the first node N1.

Optionally, the second data storage sub-circuit 203 comprises a third inverter 2031, a fourth inverter 2032, a third thin film transistor Md1 and a fourth thin film transistor Md2.

The third inverter 2031 and the fourth inverter 2032 are connected end to end; the third inverter 2031 is configured to invert the data signal written by the data writing sub-circuit 201 and output the inverted data signal to the fourth inverter 2032 or the third node N3; and the fourth inverter 2032 is configured to invert the data signal output by the third inverter 2031 and output the invented data signal to the second node N2.

A gate electrode of the third thin film transistor Md1 is connected to the first node N1, a first electrode (e.g., source electrode) of the third thin film transistor Md1 is connected to the second node N2, and a second electrode (e.g., drain electrode) of the third thin film transistor Md1 is set as a cut-off electrode.

A gate electrode of the fourth thin film transistor Md2 is connected to the first node N1, a first electrode (e.g., source electrode) of the fourth thin film transistor Md1 is connected to the third node N3, and a second electrode (e.g., drain electrode) of the fourth thin film transistor Md2 is set as a cut-off electrode.

It is to be noted, the source and drain electrodes of the third thin film transistor Md1 may be exchanged and the source and drain electrodes of the fourth thin film transistor Md2 may be exchanged.

It is to be noted, when the data signal stored in the first data storage sub-circuit 202 and output to the first node N1 is "0", if the data signal of the second data storage sub-circuit 203 is "0", the third inverter 2031 inverts the data signal to "1" and output the resultant signal to the third node N3, or the fourth inverter 2032 further inverts the data signal inverted by the third inverter 2031 to "0" and output the resultant signal to the second node N2. In the case that the data signal of the second data storage sub-circuit 203 is "1", the principles same as those in the case that the data signal written by the data writing sub-circuit 201 is "0" apply, thus a repeated description is omitted herein.

When the data signal stored in the first data storage sub-circuit 202 and output to the first node is "1", i.e., when the first node is at high level, low level signal is input via the cut-off electrodes, and the second data storage sub-circuit is in a high impedance state. In the pixel circuit provided by the embodiment of the present application, both the third thin film transistor Md1 and the fourth thin film transistor Md2 are provided with a cut-off electrode, thus the second node N2 and the third node N3 may be at low level at the same time, and whether the second storage sub-circuit 203 outputs a data signal of "0" or "1" has no effect on the circuit.

Optionally, the light-emitting control sub-circuit 204 comprises a fifth thin film transistor Ms3, a sixth thin film transistor Ms2 and a seventh thin film transistor Ms1.

A gate electrode of the fifth thin film transistor Ms3 is connected to the first node N1, a first electrode (e.g., source electrode) of the fifth thin film transistor Ms3 is connected to the first gray-scale signal input end Vdata (L127), and a second electrode (e.g., drain electrode) of the fifth thin film transistor Ms3 is connected to the gray-scale signal output end N4.

A gate electrode of the sixth thin film transistor Ms2 is connected to the second node N2, a first electrode (e.g., source electrode) of the sixth thin film transistor Ms2 is connected to the second gray-scale signal input end Vdata (L255), and a second electrode (e.g., drain electrode) of the sixth thin film transistor Ms2 is connected to the gray-scale signal output end N4.

A gate electrode of the seventh thin film transistor Ms1 is connected to the third node N3, a first electrode (e.g., source electrode) of the seventh thin film transistor Ms1 is connected to the third gray-scale signal input end Vdata (L0), and a second electrode (e.g., drain electrode) of the seventh thin film transistor Ms1 is connected to the gray-scale signal output end N4.

It is to be noted, the source and drain electrodes of the fifth thin film transistor Ms3 may be exchanged, the source and drain electrodes of the sixth thin film transistor Ms2 may be exchanged and the source and drain electrodes of the seventh thin film transistor Ms1 may be exchanged.

It is to be noted, the fifth thin film transistor Ms3, the sixth thin film transistor Ms2 and the seventh thin film transistor Ms1 in the light-emitting control sub-circuit 204 are respectively connected to the output end of the first data storage sub-circuit 202 and the output end of the second data storage sub-circuit 203, and respectively connected to the first gray-scale signal input end Vdata (L127), the second gray-scale signal input end Vdata (L255) and the third gray-scale signal input end Vdata (L0). By controlling the on/off state of the fifth thin film transistor Ms3, the sixth thin film transistor Ms2 and the seventh thin film transistor Ms1, the first gray-scale signal, the second gray-scale signal and the third gray-scale signal are output to the gray-scale signal output end N4, so that corresponding gray-scales may be rendered.

The pixel circuit provided by the embodiment of the present application is not only capable of lowering power consumption, but also rendering more gray-scales, thereby satisfying the demand for higher image quality in the industry.

It is to be noted, the correspondence between a first data signal and a second data signal at the data signal input end Vdata and the inputs at the gray-scale signal input ends in the pixel circuit provided by the embodiment of the present application is as shown in table 1, which is a pixel truth table of the pixel circuit. The first data signal refers to the data signal at the data signal input end Vdata when the first control signal input end GateA is at high level, and the second data signal refers to the data signal at the data signal input end Vdata when the second control signal input end GateB is at high level.

TABLE 1

| first data signal | second data signal | first gray-scale (L127) | second gray-scale (L255) | third gray-scale (L0) |
|---|---|---|---|---|
| 0 | 0 | 0 | 0 | 1 |
| 0 | 1 | 0 | 1 | 0 |
| 1 | X | 1 | 0 | 0 |

It is understood with reference to FIG. 2 and table 1, when the first data signal being input is "0", if the second data signal being input is "0", the seventh thin film transistor Ms1 connected to the third gray-scale signal input end Vdata(L0) is turned on, and the third gray-scale (L0) signal is output to the gray-scale signal output end N4, so that the third gray-scale (L0), i.e., black, is rendered.

When the first data signal being input is "0", if the second data signal being input is "1", the sixth thin film transistor Ms2 connected to the second gray-scale signal input end Vdata(L255) is turned on, and the second gray-scale (L255) signal is output to the gray-scale signal output end N4, so that the second gray-scale (L255), i.e., white, is rendered.

When the first data signal being input is "1", regardless of the logic level of the second data signal being "0" or "1", the second data signal being input has no impact on the circuit. The fifth thin film transistor Ms3 connected to the first gray-scale signal input end (L127) is turned on, and low level signal is input at the cut-off electrodes, such that the seventh thin film transistor Ms1 connected to the third gray-scale signal input end Vdata (L0) is cut-off and the sixth thin film transistor Ms2 connected to the second gray-scale signal input end Vdata (L255) is cut-off, the first gray-scale (L127) signal is output to the gray-scale signal output end N4, so as to render the first gray scale (L127), i.e., a gray color between black and white.

Figure 3:
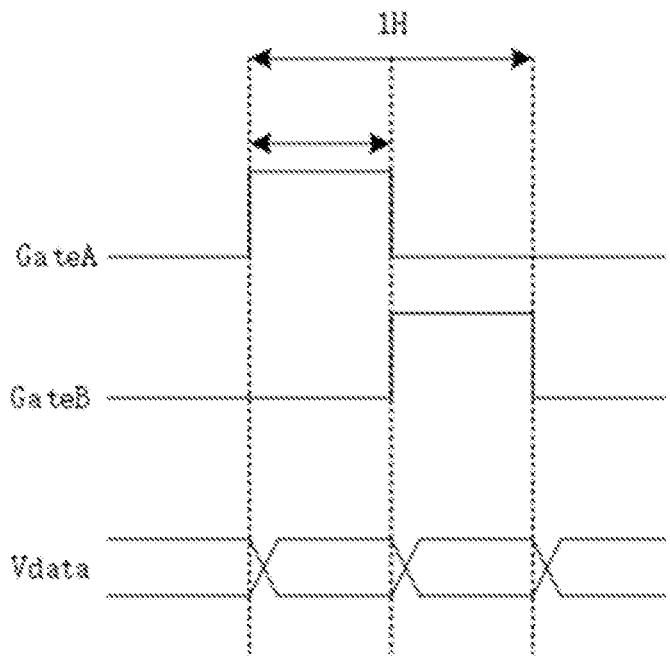
FIG. 3 is a timing sequence diagram of input control signals and data signal of a row of pixel circuits according to an embodiment of the present application.

FIG. 3 is a timing sequence diagram of input control signals and data signal of a row of pixel circuits according to an embodiment of the present application. As shown in FIG. 3, during the charging period (1H) of the row of pixel circuits, the first control signal input end GateA and the second control signal input end GateB in turn output control signals, the control signal from the first control signal input end GateA enables the input of the first data signal and the control signal from the second control signal input end GateA enables the input of the second data signal. Depending on the data signals, signals as shown in the table 1 are input to the pixel circuits, thus the pixel circuits render corresponding gray scales.

Figure 4:
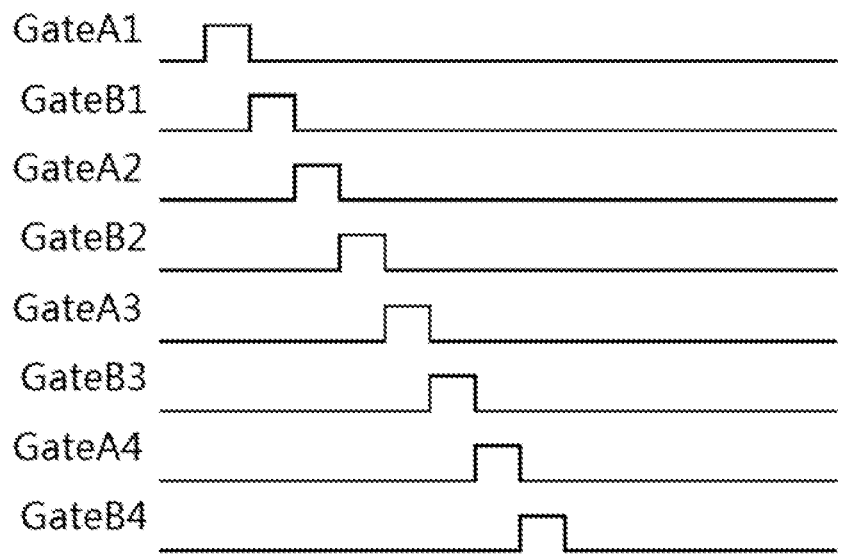
FIG. 4 is a timing sequence diagram of input control signals of multiple rows of pixel circuits according to an embodiment of the present application.

FIG. 4 is a timing sequence diagram of input control signals of multiple rows of pixel circuits according to an embodiment of the present application. As shown in FIG. 4 specifically, GateA1 and GateB1 correspond to the control signals of the first row of pixels, GateA2 and GateB2 correspond to the control signals of the second row of pixels, GateA3 and GateB3 correspond to the control signals of the third row of pixels, and GateA4 and GateB4 correspond to the control signals of the fourth row of pixels.

The working principle of the pixel circuit according to the embodiment of the present application is explained with reference to FIG. 2, FIG. 3 and FIG. 4 hereinafter.

A high level is input at the first control signal input end GateA, the first thin film transistor Mp1 is turned on, the first data signal is written to and stored at the first data storage sub-circuit 202, and the second data storage sub-circuit 203 is in Hi-z state.

A low level is input at the first control signal input end GateA, a high level is input at the second control signal input end GateB, the second thin film transistor Mp2 is turned on, thereby the second data signal is written to and stored at the second data storage sub-circuit 203.

When the first data signal being input is "0", if the second data signal being input is "0", the seventh thin film transistor Ms1 connected to the third gray-scale signal input end Vdata (L0) is turned on, and the third gray-scale (L0) signal is output to the gray-scale signal output end N4, so that the third gray-scale (L0), i.e., black, is rendered.

When the first data signal being input is "0", if the second data signal being input is "1", the sixth thin film transistor Ms2 connected to the second gray-scale signal input end Vdata (L255) is turned on, and the second gray-scale (L255) signal is output to the gray-scale signal output end N4, so that the second gray-scale (L255), i.e., white, is rendered.

When the first data signal being input is "1", regardless of the logic level of the second data signal being "0" or "1", the second data signal being input has no impact on the circuit. The fifth thin film transistor Ms3 connected to the first gray-scale signal input end (L127) is turned on, and low level signal is input at the cut-off electrodes, such that the seventh thin film transistor Ms1 connected to the third gray-scale signal input end Vdata (L0) is cut-off and the sixth thin film transistor Ms2 connected to the second gray-scale signal input end Vdata (L255) is cut-off, the first gray-scale (L127) signal is output to the gray-scale signal output end N4, so as to render the first gray scale (L127), i.e., a gray color between black and white.

Figure 5:
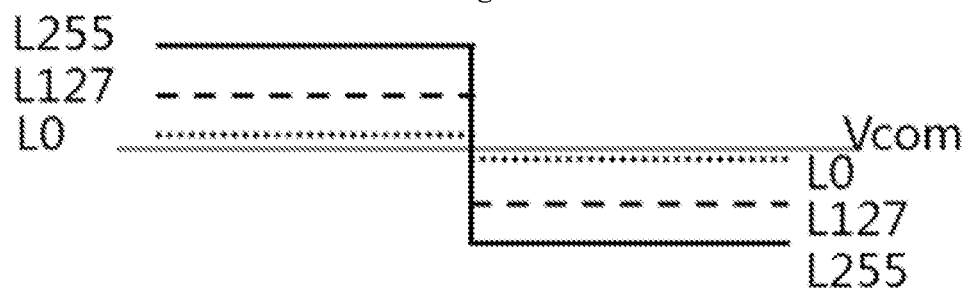
FIG. 5 is a schematic diagram of the display interval of a pixel circuit according to an embodiment of the present application.

FIG. 5 is a schematic diagram of the display interval of a pixel circuit according to an embodiment of the present application. As shown in FIG. 5, the voltage polarities of the gray-scale signals are shown with respect to the voltage of the common electrode (Vcom) or ground electrode of the display panel, the first gray-scale signal L127, the second gray-scale signal L255 and the third gray-scale signal L0 shown above the Vcom have a positive voltage polarity, and the first gray-scale signal L127, the second gray-scale signal L255 and the third gray-scale signal L0 shown below the Vcom have a negative voltage polarity. The voltage polarity of the gray-scale signal is alternated periodically, so as to prevent the deterioration of the display panel.

Embodiment 3

Based on the same concept, an embodiment of the present application provides an array substrate, comprising: a plurality of data lines, a plurality of gate lines and a plurality of sub-pixel units defined by the plurality of data lines and the plurality of gate lines crossing each other in an insulative manner, each of the plurality of sub-pixel units is provided with a pixel circuit provided by the first aspect of the embodiment of the present application; each row of the sub-pixel units corresponds to two gate lines, one of the two gate lines is connected to the first control signal input end and another one of the two gate lines is connected to the second control signal input end; and each column of the sub-pixel cells corresponds to a data line which is connected to the data signal input end.

Since the array substrate provided by the embodiment of the present application comprises a plurality of sub-pixel units and each sub-pixel unit is provided with a pixel circuit provided by the first aspect of the embodiment of the present application, the embodiment of the present application is capable of displaying three gray-scales, in contrast with the conventional art in which only two gray-scales are displayed. If two gray-scales are displayed, only eight colors can be displayed; in contrast, if three gray-scales are displayed, 27 colors can be displayed, leading to greatly improved color display capability.

The array substrate provided by the embodiment of the present application utilizes the pixel circuit according to the embodiment 1 or embodiment 2 of the present application to display more gray-scales, so as to satisfy the demand for higher image quality in the industry.

Embodiment 4

Based on the same concept, an embodiment of the present application provides a display panel, comprising: an array substrate according to the embodiment 3 of the present application, an opposite substrate arranged opposite to the array substrate, and a liquid crystal layer between the array substrate and the opposite substrate. Since the working principle thereof is the same as the pixel circuit provided by the embodiment 1 or embodiment 2 and the array substrate provided by the embodiment 3 of the present application, a repeated description is omitted herein.

Embodiment 5

Based on the same concept, an embodiment of the present application provides an electronic apparatus, comprising the pixel circuit according to the embodiment 1 or embodiment 2 of the present application or the display panel according to the embodiment 4 of the present application.

The pixel circuit, the array substrate, the display panel and the electronic apparatus provided by the embodiments of the present application are provided with multiple data signal input ends and data signal storage sub-circuits, thereby being capable of displaying more gray-scales and satisfying the demand for higher image quality in the industry.

The above descriptions merely describe part of embodiments of this application. It should be appreciated that modifications and replacements may be made in the embodiments by persons skilled in the art without departing from the principle of the present application, and these modifications and replacements shall fall within the scope of the present application.

What is claimed is:

1. A pixel circuit, comprising: a data writing sub-circuit, a first data storage sub-circuit, a second data storage sub-circuit and a light-emitting control sub-circuit;
the data writing sub-circuit is connected to a data signal input end, a first control signal input end, a second control signal input end, the first data storage sub-circuit and the second data storage sub-circuit, and is configured to write, under the control of a signal input from the first control signal input end, to the first data storage sub-circuit a data signal input from the data signal input end, and write, under the control of a signal input from the second control signal input end, to the second data storage sub-circuit the data signal input from the data signal input end;
the first data storage sub-circuit is connected to the data writing sub-circuit and a first node, and is configured to store the data signal written by the data writing sub-circuit and output the data signal to the first node;
the second data storage sub-circuit is connected to the data writing sub-circuit, the first node, a second node and a third node, and is configured to store the data signal written by the data writing sub-circuit, output the data signal to the second node, invert the data signal and output the inverted data signal to the third node; and
the light-emitting control sub-circuit is connected to the first node, the second node, the third node, a first gray-scale signal input end, a second gray-scale signal input end, a third gray-scale signal input end and a gray-scale signal output end, and is configured to output, under the control of a signal input from the first node, to the gray-scale signal output end a first gray-scale signal input from the first gray-scale signal input end, output, under the control of a signal input from the second node, to the gray-scale signal output end a second gray-scale signal input from the second gray-scale signal input end, and output, under the control of a signal input from the third node, to the gray-scale signal output end a third gray-scale signal input from the third gray-scale signal input end.

2. The pixel circuit according to claim 1, further comprising a storage capacitor;
wherein a first terminal of the storage capacitor is connected to the gray-scale signal output end, and a second terminal of the storage capacitor is connected to a common electrode or ground.

3. The pixel circuit according to claim 1, wherein the data writing sub-circuit comprises a first thin film transistor and a second thin film transistor;
a gate electrode of the first thin film transistor is connected to the first control signal input end, a first electrode of the first thin film transistor is connected to the data signal input end, and a second electrode of the first thin film transistor is connected to the first data storage sub-circuit; and
a gate electrode of the second thin film transistor is connected to the second control signal input end, a first electrode of the second thin film transistor is connected to the data signal input end, and a second electrode of the second thin film transistor is connected to the second data storage sub-circuit.

4. The pixel circuit according to claim 1, wherein the first data storage sub-circuit comprises a first inverter and a second inverter;
The first inverter and the second inverter are connected end to end; the first inverter is configured to invert the data signal written by the data writing sub-circuit and output the inverted data signal to the second inverter; and the second inverter is configured to invert the data signal output by the first inverter and output the inverted data signal to the first node.

5. The pixel circuit according to claim 1, wherein the second data storage sub-circuit comprises a third inverter, a fourth inverter, a third thin film transistor and a fourth thin film transistor;
the third inverter and the fourth inverter are connected end to end; the third inverter is configured to invert the data signal written by the data writing sub-circuit and output the inverted data signal to the fourth inverter or the third node; and the fourth inverter is configured to invert the data signal output by the third inverter and output the inverted data signal to the second node;
a gate electrode of the third thin film transistor is connected to the first node, a first electrode of the third thin film transistor is connected to the second node, and a second electrode of the third thin film transistor is set as a cut-off electrode; and a gate electrode of the fourth thin film transistor is connected to the first node, a first electrode of the fourth thin film transistor is connected to the third node, and a second electrode of the fourth thin film transistor is set as a cut-off electrode.

6. The pixel circuit according to claim 5, wherein when the first node is at high level, a low level signal is input via the cut-off electrodes, and the second data storage sub-circuit is in a high impedance state.

7. The pixel circuit according to claim 1, wherein the light-emitting control sub-circuit comprises a fifth thin film transistor, a sixth thin film transistor and a seventh thin film transistor;

a gate electrode of the fifth thin film transistor is connected to the first node, a first electrode of the fifth thin film transistor is connected to the first gray-scale signal input end, and a second electrode of the fifth thin film transistor is connected to the gray-scale signal output end;

a gate electrode of the sixth thin film transistor is connected to the second node, a first electrode of the sixth thin film transistor is connected to the second gray-scale signal input end, and a second electrode of the sixth thin film transistor is connected to the gray-scale signal output end; and a gate electrode of the seventh thin film transistor is connected to the third node, a first electrode of the seventh thin film transistor is connected to the third gray-scale signal input end, and a second electrode of the seventh thin film transistor is connected to the gray-scale signal output end.

8. An array substrate, comprising a plurality of data lines, a plurality of gate lines and a plurality of sub-pixel units defined by the plurality of data lines and the plurality of gate lines crossing each other in an insulative manner, wherein each of the plurality of sub-pixel cells is provided with a pixel circuit according to claim 1;

each row of the sub-pixel units corresponds to two gate lines, wherein one of the two gate lines is connected to the first control signal input end and another one of the two gate lines is connected to the second control signal input end; and each column of the sub-pixel units corresponds to one data line which is connected to the data signal input end.

9. A display panel, comprising an array substrate according to claim 8, an opposite substrate arranged opposite to the array substrate, and a liquid crystal layer between the array substrate and the opposite substrate.

10. An electronic apparatus, comprising a display panel according to claim 9.

* * * * *